Patented July 8, 1924.                                              1,500,848

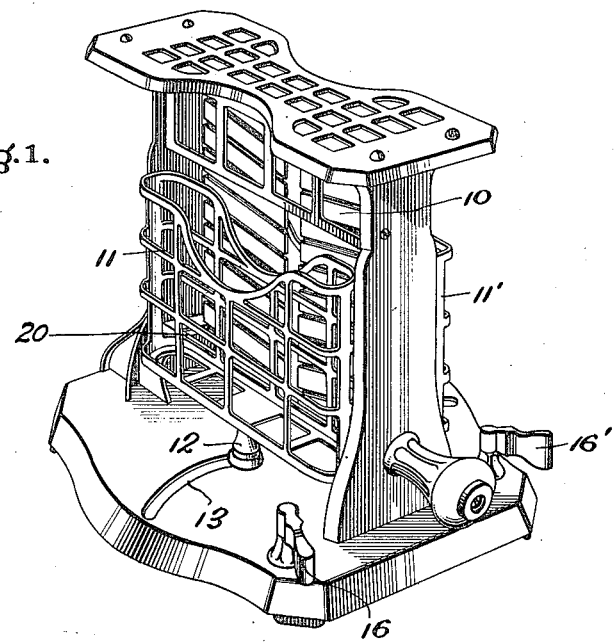
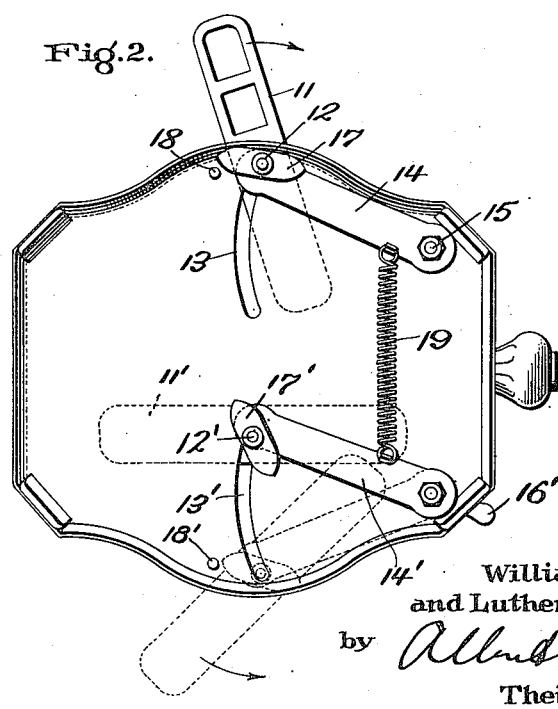

UNITED STATES PATENT OFFICE.

WILLIAM A. RANKIN AND LUTHER E. HARDIN, OF CHICAGO, ILLINOIS, ASSIGNORS TO EDISON ELECTRIC APPLIANCE COMPANY, INC., A CORPORATION OF NEW YORK.

TURNOVER TOASTER.

Application filed December 29, 1921. Serial No. 525,755.

*To all whom it may concern:*

Be it known that we, WILLIAM A. RANKIN and LUTHER E. HARDIN, citizens of the United States, residing at Chicago, in the county of Cook, State of Illinois, have invented certain new and useful Improvements in Turnover Toasters, of which the following is a specification.

This invention relates to toasters and has for its object the provision of improved means whereby the slice can be turned without removing it from the holder.

More specifically this invention relates to electric toasters of the type which are provided with a slice holder adjacent each side of the heating element, the slice holders being pivotally mounted in such a manner that they can each be turned to present the reverse side of the slice to the heating element.

In carrying out our invention we have mounted the slice holder so that it can be moved through a limited arc about an axis adjacent one end of the heating element, and also rotated on its central axis. With the slice holder supported in this way, it can be swung away from the heating element, turned on its central axis to reverse its sides and then swung back to toasting position. We have also provided means for automatically turning the holder when it is swung away from the heating element.

In the accompanying drawing, Fig. 1 is a perspective view of an electric toaster equipped in accordance with our invention; and Fig. 2 is a plan view looking up showing the automatic turning mechanism.

Referring to the drawing, adjacent one side of the heating element 10 is a slice holder 11 which is rigidly supported on a stud 12 in the central axis thereof. The lower end of stud 12, which is reduced in size, extends through an arc shaped slot 13 in the base of the toaster and is rotatably secured to the end of the arm 14. The arm 14 is rigidly attached underneath the base of the toaster to stud 15 which is journaled in the base. The upper end of the stud extends through the base and carries an operating arm 16. A short cam member 17 having pointed cam shaped ends is rigidly secured to the lower end of stud 12 at such an angle with the slice holder that when the slice holder is swung on arm 14 about the axis of stud 15, the cam member 17 engages the flanged or down-turned edge of the base and partially turns the slice holder. A pin 18 is attached to the under side of the base in such position that when the slice holder is swung to its extreme outer position, one of the pointed ends of cam member 17 is moved slightly behind it as the slice holder is turned by engagement of the other end with the base. In order to permit the cam member 17 to be moved tightly against the base, the stud 12 is attached to arm 14 near its outer edge. The slice holder is biased toward the heating element by a spiral spring 19 attached to arm 14, and is held by the tension of the spring in toasting position against a bar 20 parallel with the heating element.

Adjacent the opposite side of the heating element is a slice holder 11', which is operated in the manner previously described in connection with slice holder 11 by means of handle 16' and arm 14' to which spring 19 is also attached.

Assuming that it is desired to turn the slice, the lever 16 is turned by the operator so as to swing the slice holder about the axis of stud 15 away from the heating element. The slice holder is turned on its central axis in the direction indicated by the arrow through an approximately 90 degree angle by the engagement of one end of cam member 17 with the base, the other end of the cam member moving behind pin 18. This part of the automatic turning operation is clearly illustrated in Fig. 2 in which the slice holder 11' is shown in dotted line position as being turned by the engagement of one end of cam member 17' with the flange, the other end of cam member 17' being ready to move past pin 18' upon further movement of the slice holder. Slice holder 11 is shown in the extreme outer position, cam member 17 then being lengthwise with the flange and against it, one end having moved past and behind pin 18. Arm 16 may now be released by the operator; then the slice holder is swung back by spring 19 into toasting position, the turning of the slice holder to present its opposite face to the heating element being continued by the engagement of cam member 17 with pin 18, the slice holder being brought to rest in reversed toasting position against bar 20. Slice holder 11' is turned in a similar manner by means of handle 16'.

It will be observed that each slice holder is always turned in the same direction. The pointed cam shaped ends of member 17 may be so shaped that the turning movement is substantially continuous. The ends of member 17 engage alternately the base and the pin 18, respectively.

In accordance with the provisions of the patent statutes, we have described the principle of operation of our invention, together with the apparatus which we now consider to represent the best embodiment thereof, but we desire to have it understood that the apparatus shown is only illustrative and that the invention can be carried out by other means.

What we claim as new and desire to secure by Letters Patent of the United States, is:—

1. A toaster comprising a heating element, a slice holder supported to swing away from the heating element to permit it to turn to present another side thereto, and means whereby when the slice holder is so swung it is automatically turned.

2. A toaster comprising a heating element, a slice holder supported to swing away from the heating element, and means whereby when the slice holder is so swung it is automatically turned in the same direction through a half revolution.

3. A toaster comprising a heating element, a slice holder supported movably about a plurality of axes, and means whereby when the slice holder is swung away from the heating element about one axis it is automatically turned about another axis to present another side to the heating element.

4. A toaster comprising a heating element, a slice holder supported movably about a plurality of axes, one of which is the central axis of the slice holder, and means whereby when the slice holder is swung away from the heating element about one axis it is turned automatically on its central axis to present another side to the heating element.

5. A toaster comprising a heating element, a slice holder supported movably about a plurality of axes, a turning member carried by the slice holder, and means on the base of the toaster cooperating with said turning member, whereby when the slice holder is swung about one axes it is turned automatically about another axis to present another side to the heating element.

6. A toaster comprising a heating element, a slice holder supported movably about a plurality of axes, one of which is the central axis of the slice holder, a turning member on the axis of the slice holder, and means on the base of the toaster cooperating with the turning member, whereby when the slice holder is swung about one axis, it is turned automatically on its central axis.

7. A toaster comprising a heating element, a slice holder supported movably about a plurality of axes, one of which is the central axis of the slice holder, a cam member on the axis of the slice holder, and a pin on the base of the slice holder whereby the slice holder can be swung about one axis to cause the cam member to engage the base and the pin to turn the slice holder on its central axis.

8. A toaster comprising a heating element having a plurality of heating surfaces, a plurality of slice holders each supported movably about a plurality of axes one of which is the central axis of the slice holder, cam members on the axes of the slice holders, and means on the base of the toaster cooperating with said cam members whereby when the slice holders are swung about one of their axes through a limited arc away from the heating element they are partially turned about their central axes, said turning movement being completed to present reverse sides to the heating element when the slice holders are swung back to toasting position.

9. A toaster comprising a heating unit, a supporting base for said heating unit, an arm pivotally secured to said base, a slice holder pivotally secured to said arm so as to be rotatable thereon to present its opposite side to the heating unit when said arm is swung away from said heating unit, a turning member secured to said slice holder, and projections on said base arranged to be engaged by said turning member to reverse the slice holder when it is swung away from said heating unit.

10. A toaster comprising a heating unit, a supporting base for said heating unit provided with an arcuate slot, an arm pivotally secured on the lower side of said base, a slice holder above said base, a pivot pin support for said slice holder extending through said slot and rotatably secured to the free end of said arm, means for swinging said arm away from said heating unit so that said slice holder can be turned on said pivot to present its opposite side to said heating unit, a turning member secured to said pivot pin, and projections on said base arranged to be engaged by said turning member to reverse the slice holder when it is swung away from said heating unit.

In witness whereof, we have hereunto set our hands this 20th day of December, 1921.

WILLIAM A. RANKIN.
L. E. HARDIN.